United States Patent
Doerry et al.

(10) Patent No.: US 7,397,418 B1
(45) Date of Patent: Jul. 8, 2008

(54) SAR IMAGE FORMATION WITH AZIMUTH INTERPOLATION AFTER AZIMUTH TRANSFORM

(75) Inventors: Armin W. Doerry, Albuquerque, NM (US); Grant D. Martin, Marlborough, MA (US); Michael W. Holzrichter, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 191 days.

(21) Appl. No.: 11/446,892

(22) Filed: Jun. 5, 2006

(51) Int. Cl.
*G01S 13/90* (2006.01)

(52) U.S. Cl. .................. 342/25 R; 342/25 A; 342/25 D; 342/25 F; 342/196

(58) Field of Classification Search ............... 342/25 R, 342/25 A–25 F, 192, 196
See application file for complete search history.

(56) References Cited

U.S. PATENT DOCUMENTS

| | | | | |
|---|---|---|---|---|
| 4,471,357 A | * | 9/1984 | Wu et al. | 342/25 D |
| 4,924,229 A | * | 5/1990 | Eichel et al. | 342/25 E |
| 5,608,404 A | | 3/1997 | Burns et al. | |
| 5,861,835 A | * | 1/1999 | Hellsten | 342/25 D |
| 5,923,278 A | * | 7/1999 | Poehler et al. | 342/25 C |
| 6,011,505 A | * | 1/2000 | Poehler et al. | 342/25 C |
| 6,046,695 A | * | 4/2000 | Poehler et al. | 342/25 A |
| 6,424,287 B1 | * | 7/2002 | Doerry et al. | 342/25 R |
| 6,608,586 B1 | * | 8/2003 | Doerry | 342/25 R |
| 6,873,285 B2 | * | 3/2005 | Carrara et al. | 342/25 R |
| 7,327,305 B2 | * | 2/2008 | Loehner et al. | 342/25 B |
| 7,348,917 B2 | * | 3/2008 | Stankwitz et al. | 342/25 R |
| 2007/0188371 A1 | * | 8/2007 | Callison | 342/25 A |
| 2007/0247461 A1 | * | 10/2007 | Smith | 345/427 |
| 2007/0285302 A1 | * | 12/2007 | Aarseth et al. | 342/25 R |
| 2008/0084551 A1 | * | 4/2008 | Harnisch | 356/4.01 |

FOREIGN PATENT DOCUMENTS

| | | | |
|---|---|---|---|
| JP | 2000131428 A | * | 5/2000 |
| JP | 2003090880 A | * | 3/2003 |

OTHER PUBLICATIONS

"Two-dimensional extrapolation and spectral estimation from arbitrary sampling configurations for SAR/ISAR imaging", Cabrera, S.D et al. Signals, Systems and Computers. 1994 Conference Record of the Twenty-Eighth Asilomar Conference on vol. 1, Oct. 31-Nov. 2, 1994 pp. 145-150.*

"Optimized algorithm for synthetic aperture imaging", Stepinski, T.; Lingvall, F. Ultrasonics Symposium, 2004 IEEE vol. 1, Aug. 23-27, 2004 pp. 701-704.*

(Continued)

*Primary Examiner*—John B. Sotomayor
(74) *Attorney, Agent, or Firm*—Scott B. Stahl; William R. Conley

(57) ABSTRACT

Two-dimensional SAR data can be processed into a rectangular grid format by subjecting the SAR data to a Fourier transform operation, and thereafter to a corresponding interpolation operation. Because the interpolation operation follows the Fourier transform operation, the interpolation operation can be simplified, and the effect of interpolation errors can be diminished. This provides for the possibility of both reducing the re-grid processing time, and improving the image quality.

18 Claims, 5 Drawing Sheets

OTHER PUBLICATIONS

"Nonlinear k-space mapping method for SAR Fourier imaging", Halcrow, G.; Mulgrew, B. Radar, 2006 IEEE Conference on Apr. 24-27, 2006 p. 4 pp.*

Brown, W.M., and R.J. Fredericks, "Range-Doppler Imaging with Motion through Resolution Cells," IEEE Transactions on Aerospace and Electronic Systems, vol. AES-5, No. 1, Jan. 1969, pp. 98-102.

Walker, J.L., "Range-Doppler Imaging of Rotating Objects," IEEE Transactions on Aerospace and Electronic Systems, vol. AES-16, No. 1, Jan. 1980, pp. 23-52.

D.C. Munson, J.D. O'Brien, and W.K. Jenkins, "A Tomographic Formulation of Spotlight-Mode Synthetic Aperture Radar," Proc. IEEE, vol. 17, No. 8, pp. 917-925, Aug. 1983.

W. J. Caputi Jr., "Stretch: A Time-Transformation Technique", IEEE Transactions on Aerospace and Electronic Systems, vol. AES-7, No. 2, pp. 269-278, Mar. 1971.

C. V. Jakowatz Jr., D. E. Wahl, P. H. Eichel, D. C. Ghiglia, P. A. Thompson, *Spotlight-Mode Synthetic Aperture Radar: A Signal Processing Approach*, ISBN 0-7923-9677-4, Kluwer Academic Publishers, 1996.

Walter G. Carrara, Ron S. Goodman, Ronald M. Majewski, *Spotlight Synthetic Aperture Radar, Signal Processing Algorithms*, ISBN 0-89006-728-7, Artech House Publishers, 1995.

Armin W. Doerry, *Synthetic Aperture Radar Processing with Tiered Subapertures*, Ph.D. Dissertation, The University of New Mexico, Albuquerque, New Mexico, May 1995.

Wayne Lawton, "A New Polar Fourier Transform for Computer-Aided Tomography and Spotlight Synthetic Aperture Radar," IEEE Transactions on Acoustics, Speech, and Signal Processing, vol. 36, No. 6, pp. 931-933, Jun. 1988.

B. L. Burns, J. T. Cordaro, "SAR image formation algorithm that compensates for the spatially variant effects of antenna motion", SPIE Proceedings, vol. 2230, SPIE's International Symposium on Optical Engineering in Aerospace Sensing, Orlando, Apr. 4-8, 1994.

Armin Doerry, "Bandwidth requirements for fine resolution squinted SAR", SPIE 2000 International Symposium on Aerospace/Defense Sensing, Simulation, and Controls, Radar Sensor Technology V, vol. 4033, Orlando FL, Apr. 27, 2000.

\* cited by examiner

SAR IMAGE FORMATION WITH AZIMUTH INTERPOLATION AFTER AZIMUTH TRANSFORM

This invention was developed under Contract DE-AC04-94AL85000 between Sandia Corporation and the U.S. Department of Energy. The U.S. Government has certain rights in this invention.

FIELD OF THE INVENTION

The invention relates generally to Synthetic Aperture Radar (SAR) and, more particularly, to adapting collected SAR data for use in SAR image formation.

BACKGROUND OF THE INVENTION

Synthetic Aperture Radar (SAR) images a scene by sampling and then coherently processing RF energy returns along the radar flight path. These energy returns are the reflections from a space-varying function (scene) and may be processed to represent samples in the Fourier space of the scene. In other words, the Fourier space of the scene is the Fourier Transform of the 3-D complex reflectivity of the scene being imaged. SAR phase history data represents a polar array in the Fourier space of a scene being imaged. Polar Format processing is a known process that reformats the collected SAR data to a Cartesian (rectangular) coordinate array for efficient processing and image formation. In a real-time system, this reformatting or "re-gridding" operation is normally the most processing intensive, consuming the majority of the processing time; it also is a source of error in the final image. Because a flat scene can typically be assumed, image formation can be accomplished via a 2-D Fourier Transform. However, residual errors in the data model will effectively limit the region within the image that exhibits optimum focusing. It is therefore desirable to reduce the re-grid processing time and avoid degradations in image quality. According to exemplary embodiments of the invention, in processing two-dimensional SAR data into a rectangular grid format, the SAR data is subjected to a Fourier transform operation, followed by a corresponding interpolation operation. Because the interpolation operation follows the Fourier transform operation, the interpolation operation can be simplified, and the effect of interpolation errors can be diminished. This provides for the possibility of both reducing the re-grid processing time, and improving the image quality.

DETAILED DESCRIPTION

Exemplary embodiments of the invention exploit the frequency scaling property of the Fourier Transform, and perform azimuth interpolation after implementing the azimuth FFT. This post-azimuth FFT interpolation can improve both processing efficiency and SAR image quality.

As mentioned above, in a real-time system, the polar-to-rectangular "re-gridding" operation is the most processing intensive, consuming the majority of the processing time. Typically, 2-D data interpolation techniques are used to reformat the data. However, other known techniques can be used to reduce the processing time relative to the 2-D interpolation techniques. For example, it is known that waveform and sampling parameters associated with the SAR data collection process can be varied in a manner that effectively limits the required interpolation to a 1-D azimuth interpolation. Once the 1-D azimuth interpolation is completed, a 2-D FFT can be used to generate the image. However, it can be difficult to create an interpolation kernel to produce good results on complex data without leaving artifacts in the image. In addition, considering that the number of image pixels will often only be a relatively small fraction of the total number of points in the phase history data, the number of interpolations required can be relatively large, even when the processing is limited to a 1-D interpolation. Consequently, the azimuth interpolation procedure is often still the dominant factor in the processing time required for image formation.

Figure 1:
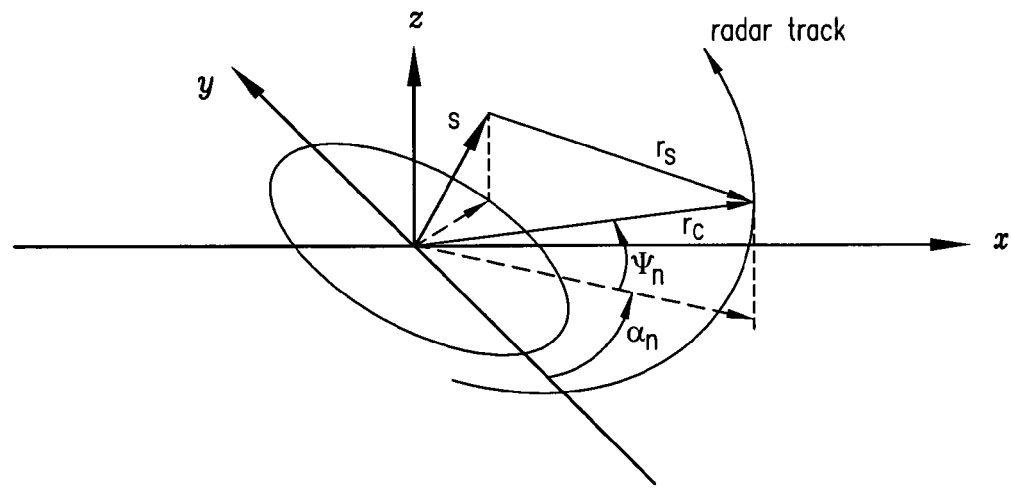
FIG. 1 graphically illustrates an example of 3-D radar geometry commonly associated with SAR applications.

Referring now to the 3-D radar geometry shown in FIG. 1,
s=the spatial location of a point target, with coordinates ($s_x$, $s_y$, $s_z$),
$r_c$=the location of the radar, with coordinates ($r_x$, $r_y$, $r_z$),
$r_s$=$r_c$−s=relation of radar location to the point target location, and
angles $\alpha_n$ (aspect angle) and $\psi_n$ (elevation angle) denote the orientation of the vector $r_c$.

Subscripts n denote parameters for the $n^{th}$ indexed pulse position along the flight path. Note that conventional SAR presumes that s is fixed, but $r_c$ varies with n. While traversing the radar track of FIG. 1, the SAR will receive from the target an echo that is a scaled and time-delayed version of the transmitted signal. The echo delay time with respect to the target depends on the distance to the target and the speed of wave propagation.

Figure 2:
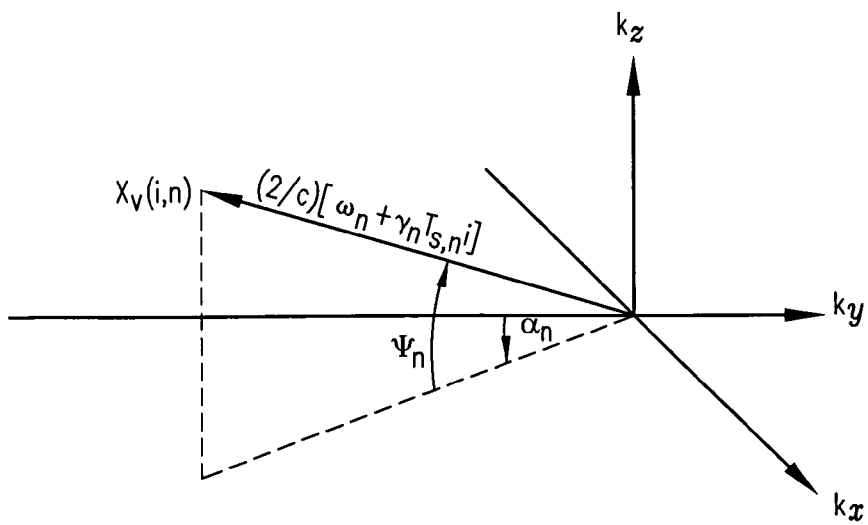
FIG. 2 graphically illustrates how a specific location in Fourier space can be represented in a spherical coordinate system.

An analog-to-digital converter (ADC) is used to sample the echo at times t'=$iT_s$, where i is the sample index and $T_s$ is the ADC sample spacing. Each individual combination of index i and index n defines a specific point in the Fourier space of the scene. Consequently, a specific phase history data sample (specific sample from a specific pulse) defines the complex value of a specific location in the Fourier space of the scene. Referring also to FIG. 2, a specific location in Fourier space of the ith sample from the nth pulse can be expressed in spherical coordinates as a distance of $$\frac{2}{c} \cdot [\omega_n + \gamma_n T_{s,n} i]$$

from the origin, at an aspect angle $\alpha_n$ from the negative $k_y$ axis, and at an elevation angle of $\psi_n$ from the $k_x$–$k_y$ plane, where
$\omega_n$=center frequency of the nth transmitted pulse,
$\gamma_n$=chirp rate of the nth transmitted pulse, and
$T_{s,n}$=ADC sample spacing for the nth pulse.

Figure 3:
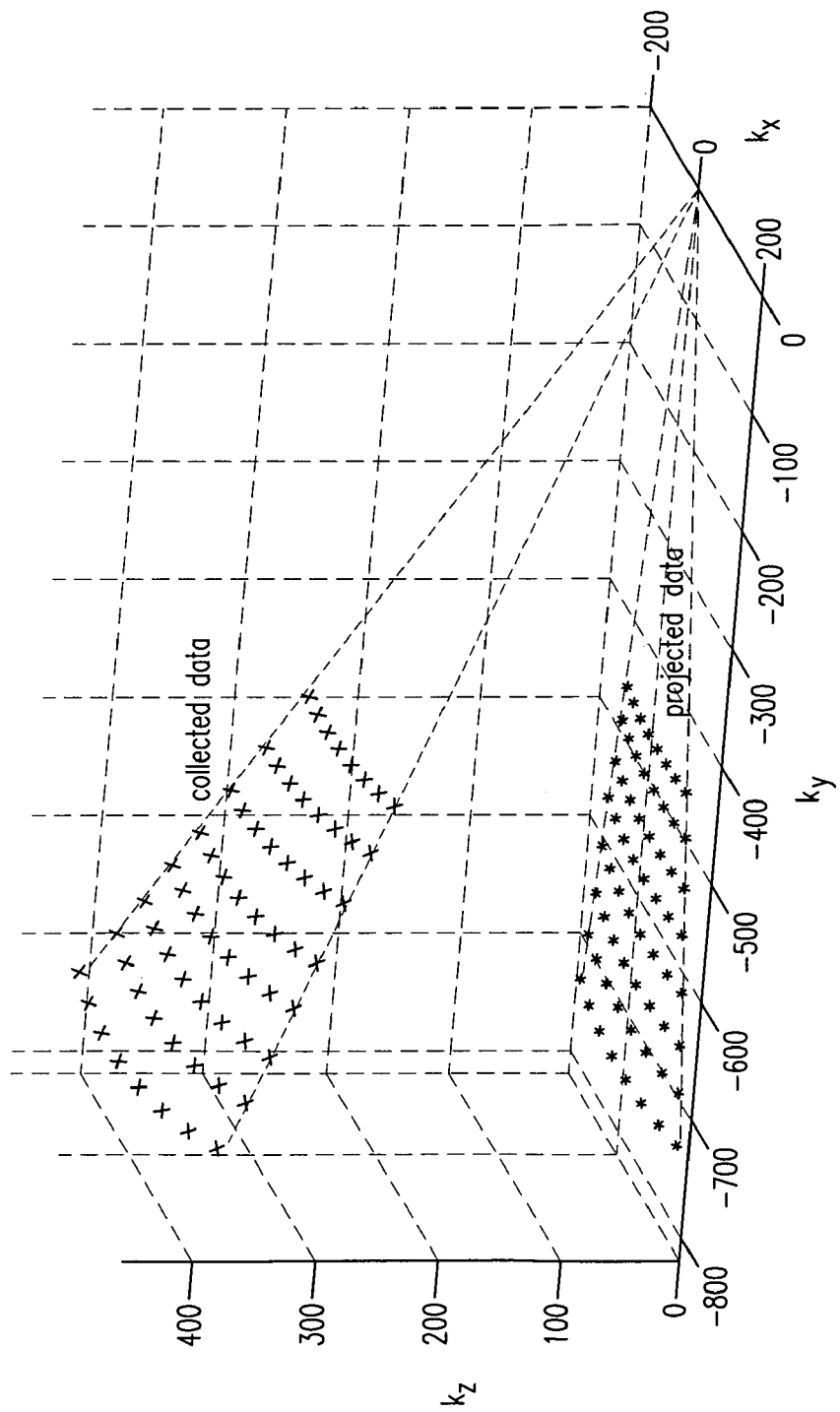
FIG. 3 graphically illustrates a conical polar wedge and corresponding 2-D polar wedge as defined by an exemplary set of collected SAR data.

A collection of phase histories will thus define a corresponding set of complex values at specific locations in the Fourier space of the scene. Data collected with constant waveform parameters, and at a constant elevation angle describes a conical polar wedge, as illustrated generally in FIG. 3. With the typical assumption of a flat scene surface ($s_z=0$), the Fourier data is unchanged across $k_z$ and can be projected onto the $k_z=0$ plane as also shown in FIG. 3. The projected data of FIG. 3 is 2-D, and can be treated as such for transformation to an image of the 3-D scene. The 2-D projected phase history data can be modeled as $$X_P(i,n) \approx A_R \sigma(s) \exp j\{k_x(i,n)s_x + k_y(i,n)s_y\} \quad (1)$$

where, $$k_x(i, n) = \frac{2}{c}[\omega_n + \gamma_n T_{s,n} i]\cos\psi_n \sin\alpha_n, \text{ and} \quad (2)$$

$$k_y(i, n) = -\frac{2}{c}[\omega_n + \gamma_n T_{s,n} i]\cos\psi_n \cos\alpha_n. \quad (3)$$

The expressions $k_x(i,n)$ and $k_y(i,n)$ above are commonly referred to as wavenumbers. These wavenumbers define coordinates of the 2-D scene in Fourier space.

As can be seen from FIG. 3, the projected data are samples on a 2-D polar wedge in the Fourier space of the scene. Given this polar wedge arrangement of the samples, and recognizing that a direct calculation of the 2-D Discrete Polar Fourier Transform is computationally intensive, it is desirable to perform a polar-to-rectangular resampling in order to use the efficiency of the 2-D FFT, and properly display the formed image.

Figure 4:
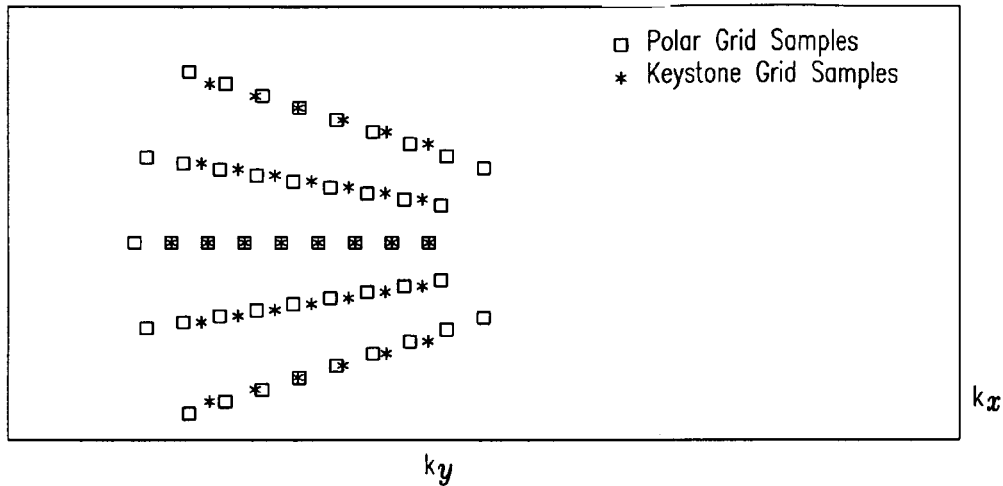
FIG. 4 graphically illustrates the result of range interpolation performed on the data of a 2-D polar wedge such as shown in FIG. 3.

Various methods exist for transforming data from a polar grid to a rectangular grid, many of which use a 2-D interpolation, but this is computationally intensive like the 2-D Discrete Polar Fourier Transform. Therefore, some known approaches use separability to perform a one-dimensional interpolation in the radial (predominantly $k_y$) direction, followed by a one-dimensional interpolation in the azimuth ($k_x$) direction. This method of interpolation is often referred to as the keystone technique, or the trapezoidal grid technique. Prior to range interpolation, the projected phase history samples are on a 2-D polar wedge (see also FIG. 3) as can be seen by the square markers in FIG. 4. Range interpolation along the radial lines of FIG. 4 produces resulting interpolated samples (also called keystone samples) as depicted by the asterisk (*) markers. The range interpolation is performed in the radial direction with the purpose of causing $k_y(i,n)$ above to be invariant with respect to the pulse index n. The next step in the keystone technique is a one-dimensional interpolation of the new keystone samples in the azimuth direction. This azimuth interpolation achieves in the azimuth direction results that are analogous to the results of the range interpolation.

Figure 5:
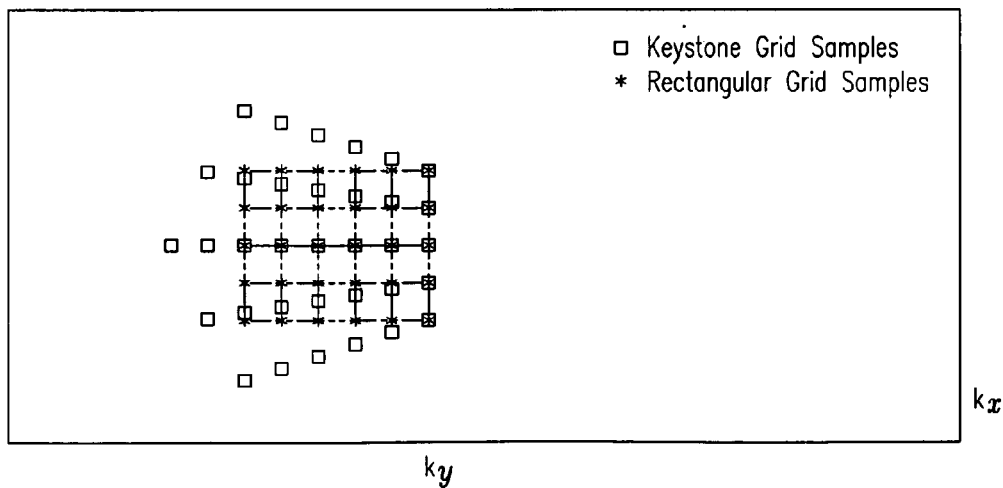
FIG. 5 graphically illustrates the result of azimuth interpolation performed on the data of FIG. 4.

FIG. 5 shows the keystone samples as square markers (see also the asterisk markers of FIG. 4), and shows the final interpolated rectangular grid samples (produced by azimuth interpolation of the keystone samples) as asterisk markers. Note from FIG. 5 that the azimuth interpolation is typically limited such that the resulting rectangular grid is inscribed within the trapezoidally-shaped aperture defined by the keystone samples. As a result of the interpolations of the keystone technique, the phase history data are samples on a rectangular grid. From this point, a simple 2-D FFT (or separate 1-D FFTs) can produce the desired image formation.

As mentioned above, it is known how to accomplish range interpolation equivalently by varying pulse-to-pulse waveform parameters (e.g., chirp rate, center frequency) and/or digital sampling parameters (e.g., ADC sampling spacing and times). Detailed descriptions of this can be found, for example, in the following documents, all of which are incorporated herein by reference:

Bryan L. Burns, J. Thomas Cordaro, "Imaging Synthetic Aperture Radar", U.S. Pat. No. 5,608,404, Mar. 4, 1997;

Armin W. Doerry, *Synthetic Aperture Radar Processing with Tiered Subapertures*, Ph.D. Dissertation, The University of New Mexico, Albuquerque, N. Mex., May 1995;

B. L. Burns, J. T. Cordaro, "SAR image formation algorithm that compensates for the spatially variant effects of antenna motion", SPIE Proceedings, Vol 2230, SPIE's International Symposium on Optical Engineering in Aerospace Sensing, Orlando, 4-8 Apr. 1994; and Armin Doerry, "Bandwidth requirements for fine resolution squinted SAR", SPIE 2000 International Symposium on Aerospace/Defense Sensing, Simulation, and Controls, Radar Sensor Technology V, Vol. 4033, Orlando Fla., 27 Apr. 2000.

Proper manipulation of waveform and/or digital sampling parameters can obviate the need for an overt range interpolation step by placing the raw data samples onto their correct Fourier domain locations to begin with. The raw collected phase history data will therefore already be in a trapezoidal format (similar to FIG. 4), and need only be interpolated in the azimuth direction before implementing a 2-D FFT to complete the image formation process.

Another approach uses waveform/digital sampling adjustments during data collection, and then applies to the collected data (see FIG. 4) a Fractional Fourier Transform (or "Chirp-Z" Transform) along the azimuth direction. This achieves the equivalent of azimuth interpolation followed by a 1-D FFT. From this point, a 1-D FFT in the range direction completes the image formation process. Although this technique avoids interpolation errors, it is often less computationally efficient than other methods that give similar quality results.

As described above, if waveform/digital sampling parameters are permitted to vary on a pulse-to-pulse basis, the effect of range interpolation can be accomplished during the data collection operation. Exemplary embodiments of the invention can further adjust the data collection operation such that the collected data also exhibits uniform spacing in the $k_x$ direction between all samples associated with any given value of the index i. This can be accomplished by causing the radar to emit and collect echo data at precise angles such that:

$$\tan \alpha_n = d\alpha \cdot n \quad (4)$$

The parameter $d\alpha$ is related to the nominal increment in the aperture angle between pulses at the center of the synthetic aperture. It is chosen to satisfy the well-known Nyquist criteria for sampled data for digital signal processing systems. It also depends on the scene diameter illuminated by the radar antenna beam. In some embodiments, it may be chosen to satisfy $$d\alpha \leq \frac{1}{\theta_{az}\omega_0 t_{c,0}\cos\psi_0} \quad (4A)$$

The amount by which $d\alpha$ is less than the right side of the inequality is determined by the antenna beam characteristics. In some embodiments, $d\alpha$ is about ⅔ of the right side of the inequality. The parameter $\theta_{az}$ is the antenna azimuth beamwidth. The antenna azimuth beamwidth $\theta_{az}$ is a function of the physical structure of the antenna (mainly its azimuth dimension) and its operating frequency. As long as the radar's pulse repetition frequency (PRF) is adequately high, any desired antenna beamwidth can be used. The minimum necessary radar PRF to avoid aliasing can be easily calculated by formulas that are well known in the art. For example, some embodiments use $$PRF > \frac{2v_x}{D_{az}}$$

where $v_x$ is the radar velocity, and $D_{az}$ is the azimuth antenna dimension. In various embodiments, the PRF is 1.5 to 2.0 times the term on the right side of the above inequality.

The parameter $t_{c,o}$ in inequality (4A) designates a nominal constant echo delay time. The nominal constant echo delay time depends on the nominal range $R_{c,0}$ to the target scene center:

$$t_{c,0} = \frac{2R_{c,0}}{c}$$

where $R_{c,0}$ is selected by the radar typically to be either 1) a desired (e.g., user-specified) range as part of some desired collection geometry to yield a desired phenomenon in the radar data (e.g. minimum stand-off range for safety), or 2) the expected range to target scene center at the center of the synthetic aperture if the current flight path is maintained.

The parameters $\omega_0$ and $\psi_0$ in inequality (4A) are nominal constant values of aperture center frequency and elevation angle, respectively. These nominal constant parameters are used in various implementations of the aforementioned conventional technique of varying waveform/digital sampling parameters on a pulse-to-pulse basis, and are re-used herein as shown above to provide the parameter $d\alpha$. The nominal constant center frequency $\omega_0$ is defined by a system designer normally as the center of the radar operating frequency band. An example would be 16.7 GHz for the Ku band. It is chosen by the system designer to comply with frequency authorizations and the phenomenology that the particular radar band is able to address.

The nominal constant scene elevation angle $\psi_0$ is selected by the radar typically to be either 1) some desired (e.g., user-specified) elevation angle as part of some desired collection geometry to yield a desired phenomenon in the radar data (e.g. minimum radar altitude above the ground at some stand-off range), or 2) the expected elevation angle to target scene center at the center of the synthetic aperture if current flight path is maintained. One example value of this nominal constant parameter would be 30 degrees.

Figure 6:
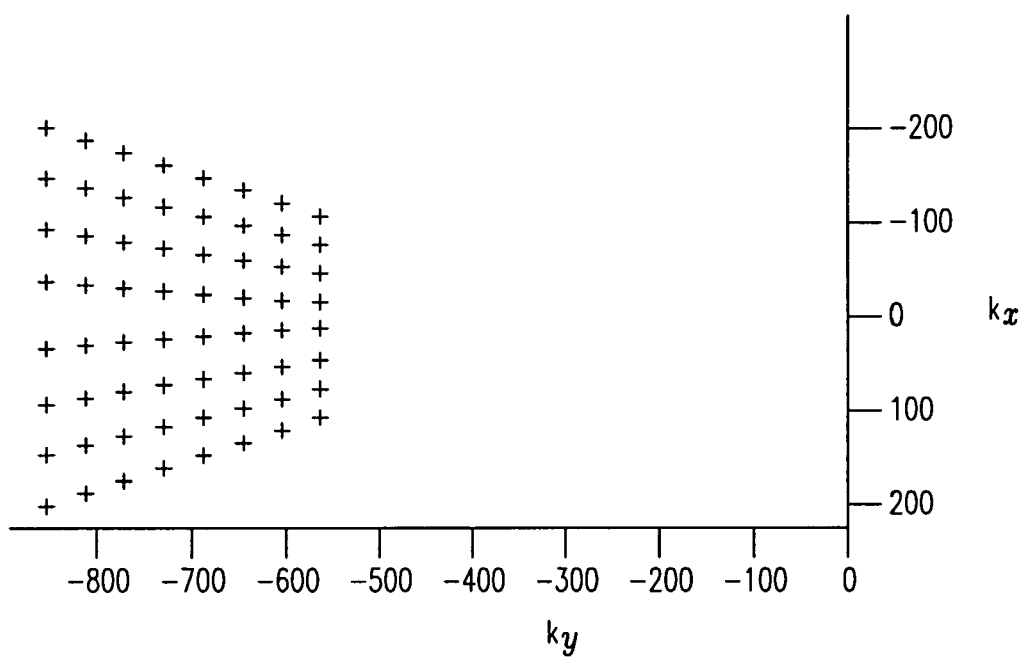
FIG. 6 graphically illustrates SAR data collected according to exemplary embodiments of the invention.

Under the condition of equation (4) above, data is collected at wavenumber locations $$k_x(i,n) = \frac{2}{c}[\omega_o + \gamma_o T_{s,o} i] \cos\psi_0 \cdot d\alpha \cdot n, \quad (4B)$$

and for any ADC index value of i, the sample spacing is constant across n. This describes an aperture with a trapezoidal projection in Fourier space, as illustrated in FIG. 6. The data of the 2-D pseudo-polar grid of FIG. 6 differs subtly from the polar wedge data of FIG. 4 due to the addition of the above-described pulse-to-pulse adjustment of $\alpha_n$ (to achieve relationship (4) above). That is, for a given value of index i, locations for $k_x$ in FIG. 6 exhibit a constant linear increment instead of the constant angular increment exhibited in FIG. 4.

The parameters $\gamma_0$ and $T_{s,0}$ in equation (4B) are nominal constant values of chirp rate and ADC sample spacing, respectively. These nominal constant parameters are used in various implementations of the aforementioned conventional technique of varying waveform/digital sampling parameters on a pulse-to-pulse basis. The nominal constant chirp rate $\gamma_0$ is chosen to achieve a particular bandwidth over the course of the individual radar pulse, where the bandwidth is chosen to achieve a desired range resolution. One example of a nominal constant chirp rate would be 6 MHz/microsecond for 1-meter range resolution with a 30-microsecond pulse.

The nominal constant ADC sample spacing $T_{s,0}$ is chosen to sample satisfactorily the radar receiver bandwidth, or intermediate frequency (IF) bandwidth in the case of a heterodyne receiver, consistent with the well-known Nyquist criteria for sampled data in digital signal processing systems. One example of a nominal constant ADC sample spacing would be 66 MHz for a radar employing stretch processing with a 30 MHz video bandwidth, and using I/Q demodulation.

Referring again to the 2-D projected phase history data of FIG. 6, this data can be modeled as $$X_Y(i,n) \approx A_R \sigma(s) \exp j\{k_x(i,n)s_x + k_y(i)s_y\} \quad (5)$$

where the Fourier samples are located at $$k_x(i,n) = \frac{2}{c}[\omega_0 + \gamma_0 T_{s,0} i] \cdot \cos\psi_0 \cdot d\alpha \cdot n, \quad (6)$$

$$k_y(i) = -\frac{2}{c}[\omega_0 + \gamma_0 T_{s,0} i] \cdot \cos\psi_0 \quad (7)$$

According to exemplary embodiments of the invention, the image formation is accomplished by applying to the FIG. 6 data a 1-D azimuth FFT, followed by a linear resampling in the azimuth direction, followed by a 1-D range FFT. The resampling in the azimuth direction is thus performed after the azimuth FFT. This order of operations is available in some embodiments due to the linear spacing provided by the azimuth sampling of the phase history data (see, e.g., FIG. 6) that is produced by implementation of relationship (4) above during the SAR data collection operation. To show how the linear spacing in azimuth is useful, the frequency scaling property of the Fourier Transform is restated here as:

$$\text{If } F\{y(t)\} = \int_{-\infty}^{\infty} y(t) \cdot e^{-j2\pi \cdot f \cdot t} dt = Y(f), \quad (8)$$

$$\text{then } F\{y(a \cdot t)\} = \int_{-\infty}^{\infty} y(a \cdot t) \cdot e^{-j2\pi \cdot f \cdot t} dt = \frac{1}{|a|} Y\left(\frac{f}{a}\right). \quad (9)$$

This also applies to the FFT as:

$$\text{If } FFT\left\{ y\left(\frac{n}{f_n}\right)\bigg|_N \right\} = \sum_n y\left(\frac{n}{f_n}\right) \cdot e^{-j\frac{2\pi}{N}u \cdot n} = Y\left(\frac{f_n}{N}u\right), \text{ and} \quad (10)$$

$$y\left(\frac{n}{f_n}\right)(\text{length N sequence})$$

is resampled to $$y\left(\frac{n'}{f_n}\right) = y\left(\frac{a \cdot n}{f_n}\right) \text{(length } N' \text{ sequence)},$$

then $$FFT\left\{y\left(\frac{n'}{f_n}\right)\Big|_{N'}\right\} = \sum_n y\left(a\frac{n}{f_n}\right) \cdot e^{-j\frac{2\pi}{N'}u \cdot n} = \frac{N}{N'} Y\left(\frac{f_n}{N} \frac{u}{a}\right). \quad (11)$$

This allows that, for a given data set, performing a FFT and then linearly resampling the output, is equivalent to first linearly resampling the data set and then performing the FFT. That is, if linear resampling is involved, it can be done either before or after the FFT with a simple inversion of the frequency multiplication factor and a constant amplitude scaling.

Recall the model for the phase history of FIG. 6, namely $$X_V(i,n) \approx A_R \sigma(s) \exp j\{k_x(i,n)s_x + k_y(i)s_y\} \quad (5)$$

where the Fourier samples are located at $$k_x(i, n) = \frac{2}{c}[\omega_0 + \gamma_0 T_{s,0} i] \cdot \cos\psi_0 \cdot d\alpha \cdot n, \quad (6)$$

$$k_y(i) = -\frac{2}{c}[\omega_0 + \gamma_0 T_{s,0} i] \cdot \cos\psi_0. \quad (7)$$

This can be rewritten as $$X_V(i,n) \approx A_R \sigma(s) \exp j\{k_y(i)s_y\} \cdot \exp j\{k_x(i,n)s_x\}. \quad (12)$$

At this point, resampling $k_x(i,n)$ in order to remove the dependence upon i could be accomplished by interpolating such that $$[\omega_o + \gamma_o T_{s,o} i] \cdot d\alpha \cdot n = [\omega_o] \cdot d\alpha \cdot n', \quad (13)$$

or otherwise finding data values at locations $$n = \frac{[\omega_o]}{[\omega_o + \gamma_o T_{s,o} i]} \cdot n' = \left(\frac{1}{1 + \frac{\gamma_o T_{s,o}}{\omega_o} i}\right) \cdot n'. \quad (14)$$

The subsequent 1-D FFT's for image formation would then operate in the n' direction and the i direction.

However, the invention performs an azimuth transform prior to interpolation. Accordingly, the 1-D FFT across index n will be examined. The 1-D FFT along the n direction of the pre-formatted phase histories (FIG. 6) is described by the expression $$FFT_n(X_V(i, n)) \approx \quad (15)$$

$$\sum_n [A_R \sigma(s) \exp j\{k_y(i)s_y\}] \cdot \exp j\{k_x(i, n)s_x\} \cdot \exp j\left\{\frac{-2\pi}{N} u \cdot n\right\}$$

The items contained in square brackets are constants as far as this particular transform is concerned, therefore $$FFT_n(X_V(i, n)) \approx [A_R \sigma(s) \exp j\{k_y(i)s_y\}] \cdot \quad (16)$$

$$\sum_n \exp j\{k_x(i, n)s_x\} \cdot \exp j\left\{\frac{-2\pi}{N} u \cdot n\right\}$$

Focusing on the summation and expanding $k_x$ yields $$\sum_n \exp j\left\{\frac{2}{c}[\omega_0 + \gamma_0 T_{s,o} i] \cdot \cos\psi_0 \cdot d\alpha \cdot n \cdot s_x\right\} \cdot \exp j\left\{\frac{-2\pi}{N} u \cdot n\right\}. \quad (17)$$

Combining the exponents in the summation yields $$\sum_n \exp j\left\{\frac{2 \cdot \omega_0 \cdot \cos\psi_0}{c} \cdot d\alpha \cdot s_x \cdot \left(1 + \frac{\gamma_0 T_{s,o}}{\omega_0} i\right) - \frac{2\pi}{N} u\right\} \cdot n. \quad (18)$$

Now, evaluating the sum results in $$W_n\left(\frac{2 \cdot \omega_0 \cdot \cos\psi_0}{c} \cdot d\alpha \cdot s_x \cdot \left(1 + \frac{\gamma_0 T_{s,0}}{\omega_0} i\right) - \frac{2\pi}{N} u\right), \quad (19)$$

making the FFT in azimuth $$FFT_n(X_V(i, n)) \approx [A_R \sigma(s) \exp j\{k_y(i)s_y\}] \cdot \quad (20)$$

$$W_n\left(\frac{2 \cdot \omega_0 \cdot \cos\psi_0}{c} \cdot d\alpha \cdot s_x \cdot \left(1 + \frac{\gamma_0 T_{s,o}}{\omega_o} i\right) - \frac{2\pi}{N} u\right)$$

where $W_n()$ represents the image 'impulse response' or 'point spread function' in the azimuth direction. In the absence of any window functions or other data tapering $$W_n(\Omega) = \sum_n e^{j\Omega n}, \quad (21)$$

which has the shape of a sin c( ) function near its peak value. The resultant FFT then has a peak response at $$\frac{2\pi}{N} u = \frac{2 \cdot \omega_0 \cdot \cos\psi_0}{c} \cdot d\alpha \cdot s_x \cdot \left(1 + \frac{\gamma_0 T_{s,0}}{\omega_0} i\right) \quad (22)$$

Note that the response of equation (22) is still dependent on index i. This dependence can be removed according to exemplary embodiments of the invention by performing azimuth interpolation after the azimuth transform. For this azimuth interpolation, some embodiments define a new index u' such that $$\frac{2\pi}{N}u' = \frac{2\cdot\omega_0\cdot\cos\psi_0}{c}\cdot d\alpha\cdot s_x. \quad (23)$$

and resample the data to interpolated positions where $$u = \frac{[\omega_o + \gamma_o T_{s,o}i]}{[\omega_o]}\cdot u' = \left(1 + \frac{\gamma_o T_{s,o}}{\omega_o}i\right)\cdot u'. \quad (24)$$

As expected from the scaling property of the Fourier Transform, equation (24) exhibits an inversion of the frequency multiplication factor associated with interpolation prior to the FFT (see also equation (14)). As a result of post-transform interpolation in the manner shown by equations (23) and (24), the data is no longer dependent upon index i. The post-transform interpolation in the azimuth direction produces an interpolated version of the azimuth FFT result, and this interpolated version is equivalent (in a known manner) to the result that would have been obtained if the azimuth-direction interpolation had been performed before the azimuth FFT. The interpolated version of the azimuth FFT result, also referred to herein as the resampled FFT, or $FFT_{nR}$, can be modeled as $$FFT_{nR}(X_V(i,n)) \approx [A_R\sigma(s)\exp j\{k_y(i)s_y\}]\cdot \quad (25)$$

$$W_n\!\left(\!\left(\frac{2\cdot\omega_0\cdot\cos\psi_0}{c}\cdot d\alpha\cdot s_x - \frac{2\pi}{N}\cdot u'\right)\!\left(1 + \frac{\gamma_o T_{s,o}}{\omega_o}i\right)\!\right)$$

Note that the index value u' for the location of the peak in $W_n(\ )$ does not depend on index i. Although the index i sill resides within the argument of $W_n(\ )$, its only impact is an inconsequential modulation of the width of the impulse response; it does not affect the (more important) location of the impulse response. This means that after performing the azimuth FFT and subsequent interpolation, the resulting data differs by only an inconsequential amplitude scale factor from the result that would be obtained by azimuth interpolation prior to the azimuth FFT. Workers in the art will recognize that this scale factor can be easily accommodated. The image formation process can continue from this point with a range dimension FFT. Any residual blurring can then be addressed with conventional auto-focus operations in the usual manner.

Figure 7:
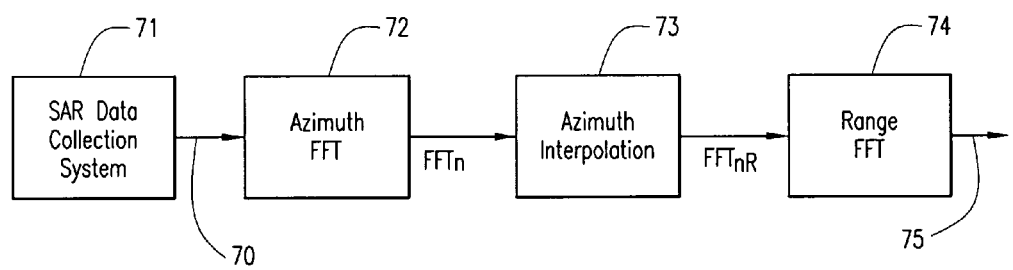
FIG. 7 diagrammatically illustrates a SAR apparatus according to exemplary embodiments of the invention.

FIG. 7 diagrammatically illustrates a SAR apparatus according to exemplary embodiments of the invention. The apparatus of FIG. 7 includes a SAR data collection system 71, an azimuth FFT processing unit 72, and azimuth interpolation unit 73, and a range FFT processing unit 74. In some embodiments, the SAR data collection system 71 provides SAR data 70 collected in the manner described above with respect to FIG. 6. The azimuth FFT processing unit 72 implements the FFT with respect to the azimuth direction of the data collected by the SAR data collection system 71, thereby producing azimuth-transformed data. In some embodiments, the azimuth-transformed data is represented by $FFT_n$ described above with respect to equations (15)-(22).

The azimuth interpolation unit 73 performs an interpolation operation with respect to the azimuth direction of the azimuth-transformed data produced by the azimuth FFT processing unit 72, thereby producing azimuth-interpolated data. In some embodiments, the interpolation operation performed by the azimuth interpolation unit 73 includes a linear resampling operation, for example, the linear resampling operation described above with respect to equations (23) and (24), and the azimuth-interpolated data is represented by $FFT_{nR}$ described above with respect to equation (25). The range FFT processing unit 74 implements the FFT with respect to the range direction of the azimuth-interpolated data produced by the azimuth interpolation unit 73, thereby producing output data 75 that is suitable for further SAR image formation processing.

The exemplary embodiments of the present invention described above provide various advantages, including those described below.

By performing the azimuth FFT prior to resampling in the azimuth direction, all of the frequency-space data is used in the FFT, not just the data within an interpolated rectangle inscribed within a polar wedge (see FIG. 5). The post-FFT azimuth interpolation can then be performed with the full available resolution.

By performing the azimuth FFT prior to azimuth interpolation, the azimuth interpolation errors are introduced later in the processing chain than in conventional practice. This can reduce the overall error in the image formation process. This also provides the capability of successfully utilizing lower-fidelity, smaller interpolation kernels than in conventional practice, because the azimuth transform processing is completed before the introduction of any errors associated with limited interpolation kernels. The interpolation can thus require potentially fewer operations. This can improve efficiency and ease of implementation, without unacceptably degrading image quality.

Because the images usually contain fewer azimuth pixels than the number of original azimuth sample points, the number of interpolations that are required by the post-transform interpolation process will often be correspondingly reduced.

It will be evident to workers in the art that the exemplary embodiments described above can be implemented, for example, in hardware, software, and combinations of hardware and software.

Although exemplary embodiments of the invention have been described above in detail, this does not limit the scope of the invention, which can be practiced in a variety of embodiments.

What is claimed is:

1. A synthetic aperture radar (SAR) method, comprising:
    receiving SAR data that has been collected to provide a two-dimensional representation of a target scene;
    processing the collected SAR data into a rectangular grid format for use in SAR image processing, including applying to the collected SAR data a Fourier transform operation with respect to a first direction to produce Fourier-transformed SAR data, and applying to the Fourier-transformed SAR data an interpolation operation with respect to said first direction to produce interpolated SAR data, wherein said first direction is defined by the rectangular grid; and,
    applying to said interpolated SAR data a Fourier transform operation with respect to a second direction defined by the rectangular grid.

2. The method of claim 1, wherein the collected SAR data includes a first plurality of data sets, each said data set corresponding to a set of locations on the rectangular grid that are uniformly spaced with respect to said first direction.

3. The method of claim 2, wherein the collected SAR data includes a second plurality of data sets, each said data set of said second plurality corresponding to a set of locations on the rectangular grid that are uniformly spaced with respect to the second direction defined by the rectangular grid.

4. The method of claim 1, wherein the collected SAR data includes a plurality of data sets, each said data set corresponding to a set of locations on the rectangular grid that are uniformly spaced with respect to the second direction defined by the rectangular grid.

5. The method of claim 1, wherein the collected SAR data has been collected according to a SAR data collection operation that includes adjusting one of a waveform parameter and a timing parameter of a radar pulse.

6. The method of claim 5, wherein the SAR data collection operation includes adjusting an angular position parameter of a radar pulse.

7. The method of claim 1, wherein the collected SAR data has been collected according to a SAR data collection operation that includes adjusting an angular position parameter of a radar pulse.

8. The method of claim 1, wherein said interpolation operation includes a linear resampling operation.

9. The method of claim 1, wherein the collected SAR data includes a plurality of data sets, each said data set corresponding to a set of locations on the rectangular grid that are uniformly spaced with respect to said first direction, and wherein the uniform grid location spacings respectively associated with at least some of said data sets differ from one another.

10. A SAR apparatus, comprising:
   an input for receiving SAR data that has been collected to provide a two-dimensional representation of a target scene;
   an apparatus coupled to said input for processing the collected SAR data into a rectangular grid format for use in SAR image processing, including a transform processing unit for applying to the collected SAR data a Fourier transform operation with respect to a first direction to produce Fourier-transformed SAR data, and an interpolation unit coupled to said transform processing unit for applying to the Fourier-transformed SAR data an interpolation operation with respect to said first direction to produce interpolated SAR data, wherein said first direction is defined by the rectangular grid; and,
   a further Fourier transform processing unit coupled to said interpolation unit for applying to said interpolated SAR data a Fourier transform operation with respect to a second direction defined by the rectangular grid.

11. The apparatus of claim 10, wherein the collected SAR data includes a first plurality of data sets, each said data set corresponding to a set of locations on the rectangular grid that are uniformly spaced with respect to said first direction.

12. The apparatus of claim 11, wherein the collected SAR data includes a second plurality of data sets, each said data set of said second plurality corresponding to a set of locations on the rectangular grid that are uniformly spaced with respect to the second direction defined by the rectangular grid.

13. The apparatus of claim 10, wherein the collected SAR data includes a plurality of data sets, each said data set corresponding to a set of locations on the rectangular grid that are uniformly spaced with respect to the second direction defined by the rectangular grid.

14. The apparatus of claim 10, wherein the collected SAR data has been collected according to a SAR data collection operation that includes adjusting one of a waveform parameter and a timing parameter of a radar pulse.

15. The apparatus of claim 14, wherein the SAR data collection operation includes adjusting an angular position parameter of a radar pulse.

16. The apparatus of claim 10, wherein the collected SAR data has been collected according to a SAR data collection operation that includes adjusting an angular position parameter of a radar pulse.

17. The apparatus of claim 10, wherein said interpolation operation includes a linear resampling operation.

18. The apparatus of claim 10, wherein the collected SAR data includes a plurality of data sets, each said data set corresponding to a set of locations on the rectangular grid that are uniformly spaced with respect to said first direction, and wherein the uniform grid location spacings respectively associated with at least some of said data sets differ from one another.

* * * * *